United States Patent [19]

Tochikawa

[11] Patent Number: 4,649,014
[45] Date of Patent: Mar. 10, 1987

[54] MOLDED ARTICLES OF NONWOVEN FABRIC CONTAINING SYNTHETIC FIBER AND PROCESS FOR PRODUCING THE SAME

[75] Inventor: Kiyoshi Tochikawa, Tokyo, Japan
[73] Assignee: Midori C.M.B. Co., Ltd., Saitama, Japan
[21] Appl. No.: 740,543
[22] Filed: Jun. 3, 1985
[30] Foreign Application Priority Data
  Jan. 18, 1985 [JP]  Japan .................................... 35-6793
[51] Int. Cl.⁴ ............................................ B29C 39/14
[52] U.S. Cl. ................................... 264/555; 264/125; 264/126; 264/257
[58] Field of Search ............... 428/283, 288, 290, 291, 428/296; 264/555, 125, 126, 257

[56] References Cited

U.S. PATENT DOCUMENTS 4,532,099  7/1985  Kaji ..................................... 428/296

Primary Examiner—Marion C. McCamish
Attorney, Agent, or Firm—George B. Oujevolk

[57] ABSTRACT

Electrically conductive molded articles obtained by heating and compressing a nonwoven fabric comprising at least one kind of synthetic fiber and an electrically conductive material blended therewith, and a process for producing an electrically conductive molded article of a desired shape by heating said nonwoven fabric at the melting or softening temperature of the synthetic fiber and then cooling it while compressing.

1 Claim, 9 Drawing Figures

MOLDED ARTICLES OF NONWOVEN FABRIC CONTAINING SYNTHETIC FIBER AND PROCESS FOR PRODUCING THE SAME

OUTLINE OF THE INVENTION (1) Field of the Invention:

This invention relates to electrically conductive molded articles of desired configurations obtained from nonwoven fabric, and a process for producing such articles.

(2) Prior Art:

Methods of producing molded articles by using binder-incorporated nonwoven fabrics have been proposed. These methods, however, have drawbacks that the component materials might be maldistributed due to transfer of the binder toward the peripheral portion during heating of the nonwoven fabric, resulting in varied performance of the molded article from one part to the other.

SUMMARY OF THE INVENTION

The present invention is intended to produce electrically conductive molded articles of desired configurations from nonwoven fabric comprising at least one kind of synthetic fiber and an electrically conductive material blended therewith, by heating said nonwoven fabric and then rapidly cooling it under compression.

OBJECT OF THE INVENTION

An object of the invention is to provide electrically conductive molded articles having wellbalanced physical, chemical and thermal properties such as elasticity, oil resistance, heat insulation, hygroscopicity, moisture releasing ability, etc., as well as mechanical properties such as flexibility, shock absorption, penetration resistance, trampling resistance, etc., by using uncostly nonwoven fabric as base, and a process for producing such articles.

Another object of the invention is to provide articles or parts capable of conducting static electricity charged on the human body to the ground, and a process for producing such articles or parts.

The nature, principle and other details of the invention will become more apparent from the following detailed description of preferred embodiments of the invention when read in conjunction with the accompanying drawings.

DETAILED DESCRIPTION OF EMBODIMENTS

The invention will be described in detail below by way of the preferred embodiments thereof.

Base material used in this invention is a nonwoven fabric made by uniformly blending the following types of noil:

polypropylene noil
acrylic noil
polyester noil
motley noil
conductive material

The conductive material includes carbon fiber, metallized glass fiber, copper-surfaced acrylic fiber, other conductive fibers with a large aspect ratio, or conductive substances worked into powdery, granular, flaky or other suitable forms. Such conductive material is blended in an amount of about 1 to 10% of the whole composition.

Figure 1:
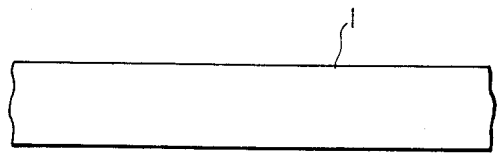
FIG. 1 is a partial side view of a nonwoven fabric used in this invention.
Figure 2:
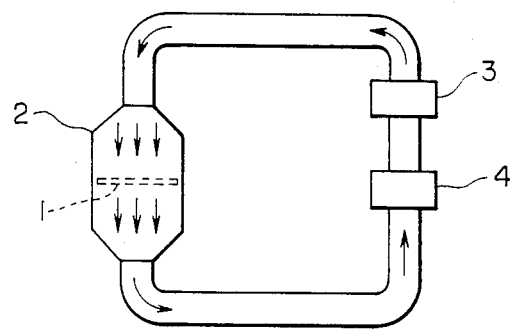
FIG. 2 is a schematic illustration of a nonwoven fabric heating device.
Figure 3:
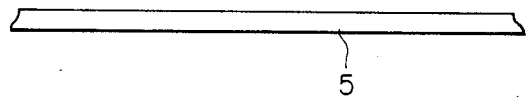
FIG. 3 is a partial side view of a flat plate molded according to the process of this invention.
Figure 4:
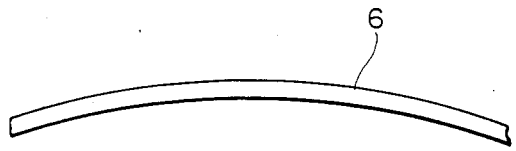
FIG. 4 is a partial side view of a bent plate molded according to the process of this invention.

The above-mentioned nonwoven fabric 1 having a thickness of about 13 mm as shown in FIG. 1 is placed in a hot-air drying chamber 2 as shown in FIG. 2. Hot air generated by a heater 3 is sent into said chamber 2 and passed through nonwoven fabric 1 by the suction of a fan 4. Hot air is thus circulated so that the entirety of the nonwoven fabric 1 will be uniformly heated to about 170° to 220° C. at which polypropylene is melted. The heated nonwoven fabric is then transferred to a press or roll compressor whereby said fabric is compressed under a pressure of 50 to 200 kg/cm$^2$ while simultaneously cooled rapidly to mold a flat plate 5 as shown in FIG. 3 or a bent plate 6 with a suitable curvature as shown in FIG. 4, such flat or bent plate having a thickness of about 3 mm.

During heating of the fabric 1, polypropylene is melted and uniformly adhered to other noils and conductive material to play a role of fiber binder. In this invention, therefore, there is no need of incorporating a specific binder in the nonwoven fabric. It is also possible to mold a plate having a desired hardness by properly selecting the blending ratio of polypropylene noil.

Figure 5:
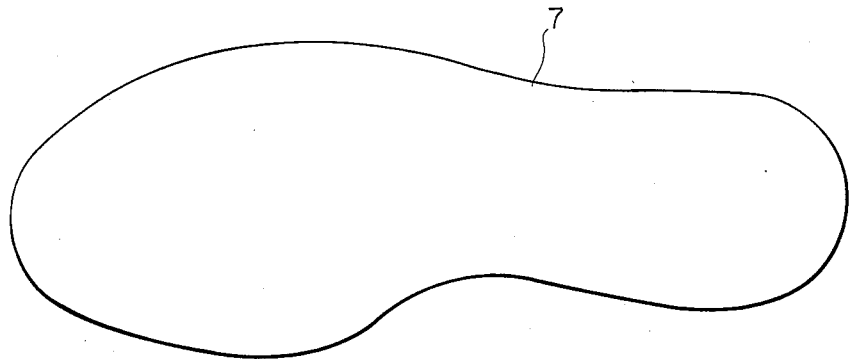
FIG. 5 is a plane view of an insole punched out from the flat plate of FIG. 3.

From the above-described process, there can be obtained, for instance, a plate having the following properties:

hardness: 90–95
flexibility: no cracking after 10,000–30,000 times of bending
trampling force: 22–28 kg/cm$^2$
electrical conductivity: at most $10^8 \Omega$. cm in electrical resistivity An electrically conductive insole 7 as shown in FIG. 5 can be produced by blanking a flat plate 5 obtained in the manner described above with a cutting die having 9 cutting pattern of an insole.

Figure 6:
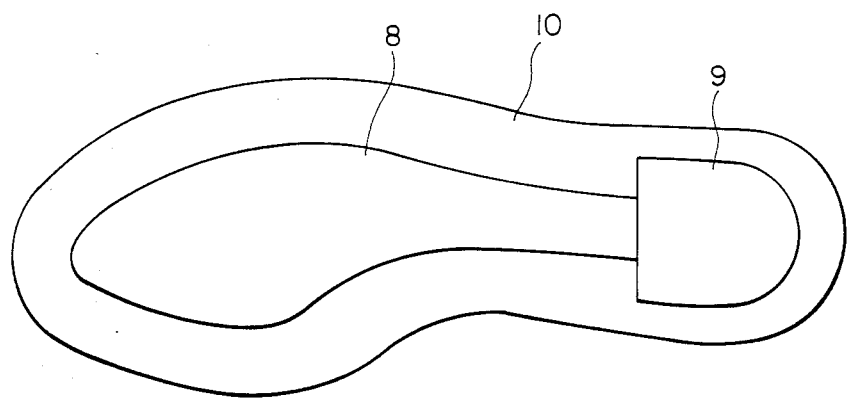
FIG. 6 is a plane view of an insole having an integral filler and heel core molded according to the process of this invention.
Figure 7:
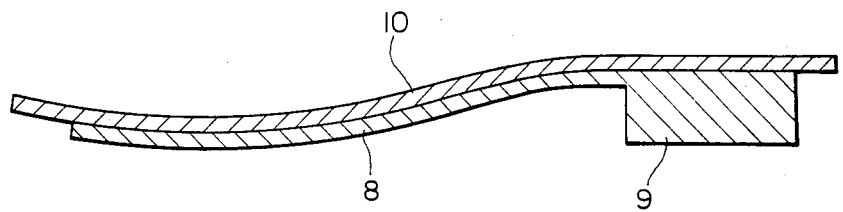
FIG. 7 is a sectional view of the insole of FIG. 6.

While the production of an insole 7 by diecutting a flat plate 5 has been described above as an embodiment, this invention also includes the molding of an insole 7 as shown in FIG. 5 or an insole 10 having a filler 8 and a heel core 9 combined integral therewith as shown in FIGS. 6 and 7 by placing said nonwoven fabric 1 in a female die designed to mold said insole 7 or in a female die capable of molding said insole 10 having integral filler and heel core, heating said nonwoven fabric to about 170° to 200° C. and then quickly cooling it while compressing in the male die.

In the step of producing a plate for insole or in the step of producing an insole, a fine mesh stainless steel net may be laid on the surface of nonwoven fabric 1 when compressed to form reticulate indentations on the surface of the plate or insole. Also, a deodorant or copper wires having both deodorizing and disinfecting effects may be incorporated in nonwoven fabric 1.

According to this invention, to flat plate 5 or bent plate 6 can be worked into various other articles such as mat, carpet, other types of floor matting, flooring, wall materials, core materials, etc., which can ground static electricity charged on the human body. In this case, said plate may be cut to a required size or may be molded to have a desired size from the start.

In the above-described embodiment, nonwoven fabric 1 is heated in its entirety, but in this invention, nonwoven fabric 1 may be partially heated and then cooled while being compressed to mold a desired article.

Figure 8:
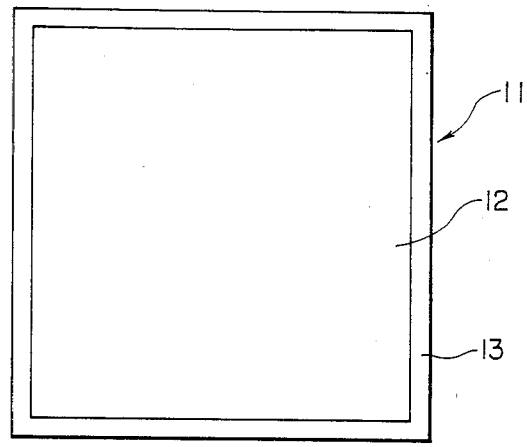
FIG. 8 is a plane view of a mat or carpet molded according to the process of this invention.
Figure 9:
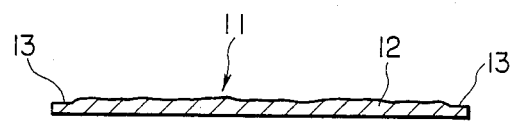
FIG. 9 is a sectional view of the mat or carpet of FIG. 8.

A typical example of the latter case will now be described with reference to FIGS. 8 and 9 wherein numeral 11 refers to a mat or carpet. A nonwoven fabric 12 having a desired area and thickness is produced by using the same materials as those used in producing nonwoven fabric 1 as shown in FIG. 1. The peripheral edge portion 13 alone of said nonwoven fabric 12 is uniformly heated to about 170° to 220° C. by a hot-air dryer or other suitable means and the heated portion is rapidly cooled while compressing it by applying a pressure of 50 to 200 kg/cm² with a press or roll compressor so that the edge portion of nonwoven fabric 12 will not become loose or fray or will have a hardness suited for joining the edge portions of two similar mattings.

The present invention is not limited to the above-described embodiments but can be equally embodied in other ways. For example, nonwoven fabric may be composed of various other blends with different types of noil as exemplified below, and such nonwoven fabric is heated at the melting or softening temperature of the synthetic fiber contained and then cooled while being compressed to mold an electrically conductive flat or bent plate.

BLEND EXAMPLE 1

(Melting Temperature: 215°–220° C.)

nylon noil
wool
cotton
electrically conductive material

BLEND EXAMPLE 2

(Melting Temperature: 250°–260° C.)

nylon 66 noil
wool
electrically conductive material

BLEND EXAMPLE 3

(Melting Temperature: 350° C.)

phenolic fiber
wool
electrically conductive material

BLEND EXAMPLE 4

(Melting Temperature: 350° C.)

fluorine-containing fiber
wool
electrically conductive material

BLEND EXAMPLE 5

(Melting Temperature: 255°–260° C.)

fluorine-containing fiber
glass fiber
electrically conductive material

BLEND EXAMPLE 6 polyester noil
wool
cotton
electrically conductive material

In another embodiment of this invention, a nonwoven fabric of any of the compositions exemplified above and another nonwoven fabric of a composition which will not melt or soften on heating and which may or may not contain electrically conductive material are laminated one upon another, and the laminate is heated to the melting or softening temperature of the synthetic fiber used and then cooled under compression to mold the laminate into a flat plate or a simply bent plate having electrical conductivity in which the plate surface on one side is hardened while that on the other side remains soft.

The present invention also embraces an embodiment in which a nonwoven fabric not melted or softened on heating and containing or not containing electrically conductive material is sandwiched between two sheets of nonwoven fabric of any of the above-exemplified compositions to constitute a three-layer laminate, and the laminate is heated to the melting or softening temperature of the synthetic fiber employed and then cooled while compressed to form a flat plate or a simply bent plate which is electrically conductive and is hardened at both sides but soft therebetween.

The nonwoven fabric of this invention molded into a flat or bent plate by heating it entirely or partially at the melting or softening temperature of synthetic fiber used therein and then cooling it under compression can not only be put to various uses in the form of said simple flat or bent plate but can also be further worked into articles of more complicated configurations by cooling while compressing said molded plate in the die simultaneously with or after die-cutting it into a desired form, or by cooling while compressing the molding after entire or partial re-heating at the melting or softening temperature of synthetic fiber in said molding by a dryer, hot press, preheater or other suitable means, or by further compressing the molding in a die entirely or partially heated by a suitable heating means. In case of using the compositions of Blend Examples 3 to 5, it is possible to obtain molded articles of various forms having flame retardancy.

Having the above-described structural features, the present invention can eliminate the problem of maldistribution of component material due to flow of a binder to the peripheral portion on heating as seen in the conventional binder-blended nonwoven fabric, and hence the variation of product performance according to the part thereof can be substantially eliminated. It is thus possible according to this invention to produce, by using uncostly materials, electrically conductive molded articles having excellent physical, chemical and thermal properties such as elasticity, oil resistance, heat insulation, water resistance, hydroscopicity, moisture releasing ability, etc., as well as mechanical properties such as flexibility, shock absorption, penetration resistance, trampling resistance, etc., all uniformly and well-balanced. Such articles include, for example, matting, wall material, insole of shoe and the like capable of grounding static electricity charged on the human body, and the products and parts which are required to be electrically conductive. Also, the process of this invention is simple and suited for mass production. Especially, an insole molded from a plate produced by the process of this invention, or an insole produced according to the process of this invention, which can well perform the essential function of insole, permits of fast nailing in the step of hanging to the heel and also will not be bent even when given pressure in the hanging step, so that it is possible to eliminate trouble in this step of show making process. Further, since such an insole is electrically conductive throughout its structure, it is quite suited for use in conductive shoes or electrostatic shoes. Still further, in use of the conductive or electrostatic shoes made by using said insole, the insole is perfectly free of wrinkling or raveling and rising of fibers at the part where bending and stretching take place most frequently. Moreover, even if water should have penetrated into the shoe in use, the insole will not swell and can maintain its original strength for a long period of time.

What is claimed is:

1. A process of making a nonwoven fabric finished material useful as a sole for footwear, consisting of the steps of
   (a) blending a material selected from the group consisting of polypropylene noil, acrylic noil, polyester noil, motley noil, with a conductive material selected from the group consisting of carbon fibers, metallized glass fibers, copper-surface acrylic fibers and mixtures thereof, the conductive material being blended with the noil material in a ratio of about 1% to about 10%, by weight of the entire composition to form a nonwoven workpiece having a thickness of about 13 mm;
   (b) placing said workpiece in a hot-air drying zone so as to pass hot air through the workpiece at a heat of about 170° C. to about 220° C. at which temperature range the workpiece is melted;
   (c) compressing said workpiece under pressure of about 50 to about 200 kg/cm$^2$ while rapidly cooling the workpiece and molding the workpiece to form a plate of a thickness of about 3 mm; and,
   (d) cutting the workpiece into a desired shape with a cutting die.

* * * * *